(12) United States Patent
Ciccone et al.

(10) Patent No.: US 11,383,614 B2
(45) Date of Patent: Jul. 12, 2022

(54) VEHICLE BATTERY POWER MANAGEMENT SYSTEMS AND METHODS

(71) Applicant: Ford Global Technologies, LLC, Dearborn, MI (US)

(72) Inventors: Thomas Ciccone, West Bloomfield, MI (US); Timothy Baxendale, Royal Oak, MI (US); Rian Edman, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 419 days.

(21) Appl. No.: 16/589,893

(22) Filed: Oct. 1, 2019

(65) Prior Publication Data
US 2021/0094438 A1    Apr. 1, 2021

(51) Int. Cl.
| | |
|---|---|
| *B60L 58/12* | (2019.01) |
| *B60L 3/00* | (2019.01) |
| *B60L 50/30* | (2019.01) |
| *B60L 58/24* | (2019.01) |
| *F02D 41/06* | (2006.01) |
| *F02D 41/26* | (2006.01) |
| *B60L 58/40* | (2019.01) |

(52) U.S. Cl.
CPC .............. *B60L 58/12* (2019.02); *B60L 3/0046* (2013.01); *B60L 50/30* (2019.02); *B60L 58/24* (2019.02); *B60L 58/40* (2019.02); *F02D 41/062* (2013.01); *F02D 41/26* (2013.01); *B60L 2240/545* (2013.01); *B60L 2240/547* (2013.01); *F02N 2200/023* (2013.01)

(58) Field of Classification Search
None
See application file for complete search history.

(56) References Cited

U.S. PATENT DOCUMENTS

| | | | |
|---|---|---|---|
| 9,828,924 B1 | 11/2017 | Connolly et al. | |
| 9,878,631 B2 | 1/2018 | Hyde et al. | |
| 2008/0114501 A1* | 5/2008 | Wu | B60R 25/209 701/2 |
| 2011/0030638 A1* | 2/2011 | Newman | F02N 11/0807 123/179.2 |
| 2017/0253127 A1* | 9/2017 | Ciaccio | B60L 58/18 |

* cited by examiner

*Primary Examiner* — Jared Fureman
*Assistant Examiner* — Joel Barnett
(74) *Attorney, Agent, or Firm* — David B. Kelley; Brooks Kushman P.C.

(57) ABSTRACT

A vehicle includes a combustion engine configured to output mechanical power and an electric machine coupled to the engine and configured to convert the mechanical power to electrical power. The vehicle also includes a battery to exchange electrical power with the electric machine. The vehicle further includes a controller programmed to receive user inputs indicative of a desired storage duration and a storage location and monitor a battery state of charge (SOC) while the vehicle is stored. The controller is also programmed to prompt a remote user to approve an engine auto-start in response to the SOC depleting to less than a predetermined threshold during storage, and to auto-start the engine to generate power to recharge the battery in response to remote user approval. The controller is further programmed to inhibit the auto-start of the engine in response to the vehicle being stored in an enclosed storage location.

19 Claims, 3 Drawing Sheets

VEHICLE BATTERY POWER MANAGEMENT SYSTEMS AND METHODS

TECHNICAL FIELD

This application is related to maintaining a vehicle battery over an extending storage period.

BACKGROUND

Vehicles having electrified propulsion systems may include a rechargeable high-voltage battery to provide power to one or more electric machines as well as other vehicle systems. Over time battery power may become depleted even when unused, such as during periods of extended duration vehicle storage.

SUMMARY

A vehicle includes a combustion engine configured to output mechanical power and an electric machine coupled to the engine and configured to convert the mechanical power to electrical power. The vehicle also includes a battery configured to exchange electrical power with the electric machine. The vehicle further includes a controller programmed to receive a user input indicative of at least one of a desired storage duration and a storage location and monitor a battery state of charge (SOC). In response to the SOC depleting to less than a predetermined threshold while the vehicle is stored, the controller is programmed to auto-start the engine to generate power to recharge the battery. The controller is also programmed to deactivate the engine in response to the SOC exceeding the predetermined threshold while the vehicle is stored. The controller is further programmed to maintain a count of engine auto-starts that occur while the vehicle is continuously stored between drive cycles, and in response to the count exceeding a count threshold, perform an extended engine idle to burn residual excess fuel intermixed with engine oil.

A method for maintaining battery health during storage of a hybrid vehicle having a combustion engine and a battery-powered electric machine includes monitoring a battery SOC while the hybrid vehicle is parked. The method also includes automatically starting the engine to generate power to recharge the battery in response to the SOC depleting to less than a predetermined threshold. The method further includes deactivating the engine in response to the SOC being replenished to greater than the predetermined threshold. The method further includes maintaining a count of engine auto-starts that occur while the vehicle is continuously stored between drive cycles, and in response to the count exceeding a threshold, performing an extended engine idle to burn residual excess fuel intermixed with engine oil.

A vehicle includes a combustion engine configured to output mechanical power and an electric machine coupled to the engine and configured to convert the mechanical power to electrical power. The vehicle also includes a battery configured to exchange electrical power with the electric machine. The vehicle further includes a controller programmed to receive a user input indicative of at least one of a desired storage duration and a storage location and monitor a battery state of charge (SOC) while the vehicle is stored. The controller is also programmed to prompt a remote user to approve an engine auto-start in response to the SOC depleting to less than a predetermined threshold while the vehicle is stored, and to auto-start the engine to generate power to recharge the battery in response to remote user approval. The controller is further programmed to inhibit the auto-start of the engine in response to the vehicle being stored in an enclosed storage location.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Battery temperature is a key input in the efficacy of the power exchange with the battery. When a hybrid electric vehicle (HEV) vehicle is not driven for an extended period of time, the state of charge (SOC) of the high-voltage and/or low-voltage batteries depletes. At the same time, this loss of charge is exaggerated by cold or low ambient temperatures. Moreover, an HEV that relies on the high-voltage battery to start an internal combustion engine may become inoperable after the high-voltage battery SOC has depleted to less than a threshold level. The high-voltage battery can only be charged by driving the vehicle and there is no convenient way for the customer to "jump start" an HEV high-voltage system. The result is a need for the vehicle to be towed to a dealership for service, causing customer dissatisfaction, cost, and loss of time.

The temperature signal output from a battery senor may be used as a basis to determine the required degree of thermal preconditioning to maintain desired battery operating conditions. Additional aspects of the present disclosure include using data transmitted from the remote weather information source for system control. Since the vehicle is already equipped with a wireless communication module for telematics and other purposes, vehicle telecommunications may be used to prompt a customer to remotely authorize the initiation of charging of the high-voltage battery. This may help to mitigate the effects on a battery caused by extended storage periods and/or cold temperatures.

Figure 1:
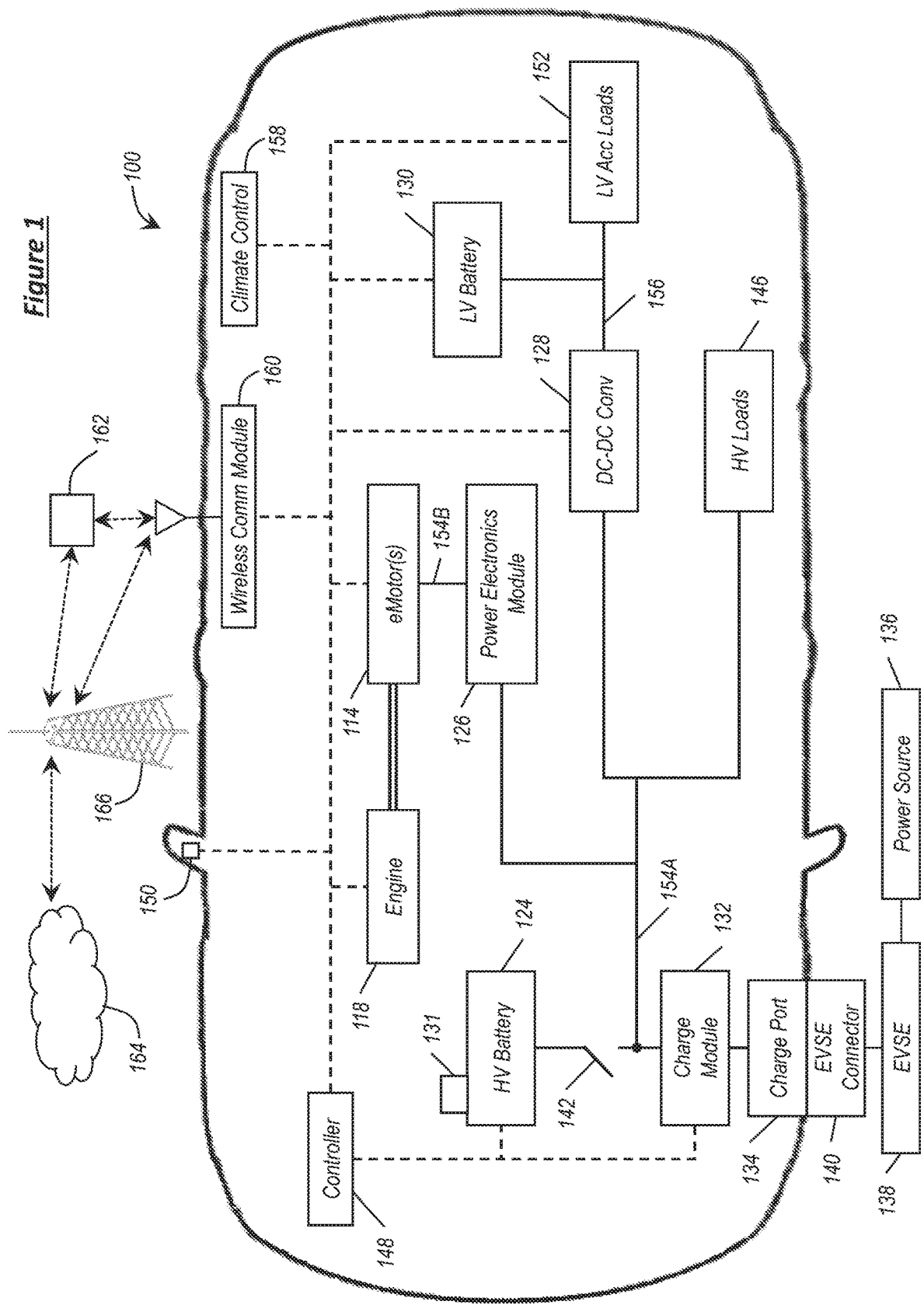
FIG. 1 is a schematic of a vehicle having an electrified propulsion system.

FIG. 1 depicts a plug-in hybrid-electric vehicle (PHEV) 100. The PHEV 100 includes an electrified propulsion system having one or more battery-powered electric machines 114 mechanically coupled to a hybrid transmission (not shown). Each of the electric machines 114 may be capable of operating either as a motor or as a generator. In addition, the electric machines 114 are mechanically coupled to an internal combustion engine 118. When operated, the engine 118 is configured to output torque. The electric machines 114 are arranged to provide propulsion torque as well as slowing torque capability either while the engine 118 is operated or turned off. The electric machines 114 are also capable of operating as generators to provide fuel economy benefits by recovering energy that would normally be lost as heat in a friction braking system. The electric machines 114 may additionally impart a reaction torque against the engine output torque to generate electricity for recharging a traction battery the while the engine 118 is operating. The electric machines 114 may further reduce vehicle emissions by allowing the engine 118 to operate near the most efficient speed and torque ranges. When the engine 118 is off, the PHEV 100 may be operated in an electric-only drive mode using the electric machines 114 as the sole source of propulsion.

The hybrid transmission is also mechanically coupled to road wheels to output torque from the electric machines 114 and/or combustion engine 118. While the topology of hybrid vehicle 100 is provided by way of example, aspects of the present disclosure may be applicable to any vehicle having a hybrid-electric propulsion system.

A rechargeable traction battery or battery pack 124 stores energy that can be used to power the electric machines 114. The battery 124 typically provides a high-voltage direct current (DC) output from one or more battery cell arrays, sometimes referred to as battery cell stacks, within the traction battery 124. Each battery cell array may include one or more battery cells. The battery cells, such as a prismatic, pouch, cylindrical, or other types of cells, are used to convert stored chemical energy to electrical energy. The cells may include a housing, a positive electrode (cathode) and a negative electrode (anode). An electrolyte allows ions to move between an anode and cathode during discharge, and then return during recharge. Terminals may allow current to flow out of the cell for use by the vehicle. Different battery pack configurations may be available to address individual vehicle variables including packaging constraints and power requirements. Discussed in more detail below, the battery cells may be thermally regulated by a thermal-management system. Examples of thermal-management systems include air cooling systems, liquid cooling systems and a combination of air and liquid systems.

One or more contactors 142 may selectively isolate the traction battery 124 from a DC high-voltage bus 154A when opened and couple the traction battery 124 to the DC high-voltage bus 154A when closed. The traction battery 124 is electrically coupled to one or more power electronics modules 126 via the DC high-voltage bus 154A. The power electronics module 126 is also electrically coupled to the electric machines 114 and provides the ability to bi-directionally transfer energy between AC high-voltage bus 154B and the electric machines 114. According to some examples, the traction battery 124 may provide a DC current while the electric machines 114 operate using a three-phase alternating current (AC). The power electronics module 126 may convert the DC current to a three-phase AC current to operate the electric machines 114. In a regenerative mode, the power electronics module 126 may convert the three-phase AC current output from the electric machines 114 acting as generators to DC current compatible with the traction battery 124. The description herein is equally applicable to an all-electric vehicle without a combustion engine.

In addition to providing energy for propulsion, the traction battery 124 may provide energy for other vehicle electrical systems. The vehicle 100 may include a DC/DC converter module 128 that is electrically coupled to the high-voltage bus 154. The DC/DC converter module 128 may be electrically coupled to a low-voltage bus 156. The DC/DC converter module 128 may convert the high-voltage DC output of the traction battery 124 to a low-voltage DC supply that is compatible with low-voltage vehicle loads 152. The low-voltage bus 156 may also be electrically coupled to an auxiliary battery 130 (e.g., a 12-volt battery). The low-voltage loads 152 may be electrically connected to one or more power sources over the low-voltage bus 156. The low-voltage loads 152 may include various controllers within the vehicle 100.

In some examples, such as a PHEV, the traction battery 124 of vehicle 100 may be recharged by an off-board power source 136. The off-board power source 136 may be a connection to an electrical outlet. The external power source 136 may be electrically coupled to a charging station or another type of electric vehicle supply equipment (EVSE) 138. The off-board power source 136 may also be an electrical power distribution network or grid as provided by an electric utility company. The EVSE 138 provides circuitry and controls to regulate and manage the transfer of energy between the power source 136 and the vehicle 100. The off-board power source 136 may provide DC or AC electric power to the EVSE 138. The EVSE 138 includes a charge connector 140 for plugging into a charge port 134 of the vehicle 100. The charge port 134 may be any type of port configured to transfer power from the EVSE 138 to the vehicle 100. The charge port 134 may be electrically coupled to a charge module or on-board power conversion module 132. The power conversion module 132 conditions power supplied from the EVSE 138 to provide the proper voltage and current levels to the traction battery 124. The power conversion module 132 interfaces with the EVSE 138 to coordinate the delivery of power to the vehicle 100. The EVSE connector 140 may have pins that mate with corresponding recesses of the charge port 134. Alternatively, various components described as being electrically coupled or connected may transfer power using wireless inductive coupling or other non-contact power transfer mechanisms. The charge components including the charge port 134, power conversion module 132, power electronics module 126, and DC-DC converter module 128 may collectively be considered part of a power interface system configured to receive power from the off-board power source 136.

When the vehicle 100 is plugged in to the EVSE 138, the contactors 142 may be in a closed state so that the traction battery 124 is coupled to the high-voltage bus 154 and to the power source 136 to charge the battery. The vehicle may be in the ignition-off condition when plugged in to the EVSE 138. Of course, when the vehicle is stored at a location where plug-in charging is unavailable, both the high-voltage traction battery 124 and low-voltage auxiliary battery 130 may be subject to SOC depletion and discharge capacity degradation effects The traction battery 124 may also have one or more temperature sensors 131 such as thermistors or other types of temperature sensors. The temperature sensor 131 may be in communication with the controller 148 to provide data indicative of temperature of the battery cells. The vehicle 100 may also include temperature sensor 150 to provide data indicative of ambient air temperature. In the example schematic of FIG. 1, the temperature sensor 150 is disposed in a vehicle side mirror, but it should be appreciated that the temperature sensor may be located anywhere on the vehicle suitable to detect ambient temperature.

One or more high-voltage electrical loads 146 may be coupled to the high-voltage bus 154. The high-voltage electrical loads 146 may have an associated controller that operates and controls the high-voltage electrical loads 146 when appropriate. The high-voltage loads 146 may include compressors and electric heaters related to the vehicle climate control system 158. For example, the vehicle climate control system may draw high-voltage loads in the range of 6 kW-11 kW under high cooling loads. According to some examples, the rechargeable battery 124 supplies powers at least a portion of the climate control system 158.

The vehicle 100 further includes at least one wireless communication module 160 configured to communicate with external devices, over a wireless network. According to some examples, wireless communication module includes a BLUETOOTH transceiver to communicate with a user's remote device 162 (e.g., cell phone, smart phone, PDA, or any other device having wireless remote network connectivity). The remote device 162 can in turn be used to communicate with a network 164 outside the vehicle 100 through, for example, communication with a cellular tower 166. In some examples, tower 166 may be a WiFi access point.

Data may be communicated between the wireless communication module 160 and a remote network utilizing, for example, a data-plan, data over voice, or DTMF tones associated with the remote device 162. Alternatively, the wireless communication module 160 may include an onboard modem having antenna in order to exchange data with the network 164 over the voice band. According to some examples, the controller 148 is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In further example, remote device 162 includes a modem for voice band or broadband data communication. In the data-over-voice example, a technique known as frequency division multiplexing may be implemented when the owner of the nomadic device can talk over the device while data is being transferred. At other times, when the owner is not using the device, the data transfer can utilize the entire bandwidth. Further data transfer protocols may also be suitable according to aspects of the present disclosure, for example, such as Code Domain Multiple Access (CDMA), Time Domain Multiple Access (TDMA), and Space-Domain Multiple Access (SDMA) for digital cellular communication.

The various components discussed may have one or more associated controllers to control, monitor, and coordinate the operation of the components. The controllers may communicate via a serial bus (e.g., Controller Area Network (CAN)) or via discrete conductors. In addition, a vehicle system controller 148 may be provided to coordinate the operation of the various components.

System controller 148, although represented as a single controller, may be implemented as one or more controllers. The controller 148 may monitor operating conditions of various vehicle systems. According to the example of FIG. 1, at least the electric machines 114, engine 118, traction battery 124, auxiliary battery 130, DC-DC converter 128, charging module 132, high-voltage loads 146, low-voltage loads 152, and vision system 158 are in communication with the controller 148.

The controller 148 also generally includes any number of subcomponents such as microprocessors, ASICs, ICs, memory (e.g., FLASH, ROM, RAM, EPROM and/or EEPROM) and software code to co-act with one another to perform various operations. The subcomponents allow onboard processing of commands and execute any number of predetermined routines according to a desired timing or alternatively in response to one or more inputs received from vehicle systems. The processors may be coupled to non-persistent storage and/or persistent storage. In an example configuration, the non-persistent storage is RAM, and the persistent storage is flash memory. In general, persistent (non-transitory) storage can include all forms of storage that maintain data when a computer or other device is powered down. The controller 148 may also store predetermined data within the memory, such as "look up tables" that are based on calculations and/or test data. The controller communicates with other vehicle systems and sub-controllers over one or more wired or wireless vehicle connections and may use common bus protocols (e.g., CAN and LIN). Used herein, references to "a controller" refer to one or more controllers.

The traction battery 124 includes a current sensor to output a signal indicative of a magnitude and direction of current flowing into or out of the traction battery 124. The traction battery 124 also includes a voltage sensor to sense a voltage across terminals of the traction battery 124. The voltage sensor outputs a signal indicative of the voltage across the terminals of the traction battery 124. The traction battery 124 may also have one or more temperature sensors 131 such as thermistors or other types of temperature sensors. The temperature sensor 131 may be in communication with the controller 148 to provide data indicative of temperature of the battery cells.

The current sensor, voltage sensor, and temperature sensor outputs of the traction battery 124 are all provided to the controller 148. The controller 148 may be programmed to compute the battery's SOC based on the signals from the current sensor and the voltage sensor of the traction battery 124. Various techniques may be utilized to compute the state of charge. For example, an ampere-hour integration may be implemented in which the current through the traction battery 124 is integrated over time. The SOC may also be estimated based on the output of the voltage sensor of the traction battery. The specific technique utilized may depend upon the chemical composition and characteristics of the particular battery.

A desired temperature operating range may also be specified for the traction battery. The temperature operating range may define upper and lower thermal limits within which the battery 124 is operated. In response to a sensed temperature approaching a thermal limit, operation of the traction battery 124 may be modified or other mitigation actions may be initiated to actively regulate temperature. According to some example configurations, the traction battery 124 as well as other vehicle components are thermally regulated with one or more thermal-management systems.

Discussed in more detail below, vehicle may condition the battery based on executing one or more algorithms stored at the controller 148. According to some examples, the engine is started during extended storage periods in order to maintain battery SOC for optimal on-demand operation. The controller monitors the health of the high-voltage battery while not in operation, and if for any reason the high-voltage battery is depleted to less than a predetermined SOC level, the user is prompted by a smartphone application to remotely start the vehicle. The user may be required to confirm that the vehicle is in a non-enclosed storage location prior to starting the engine. The user is also notified of current fuel levels. If the user provides the requisite confirmation, the vehicle will automatically start the engine, charge the high-voltage battery and/or the low/voltage battery, and then shut down the engine. In other examples, the engine may be auto-started during extended storage periods to thermally precondition the battery to maintain optimal energy exchange and avoid degraded performance due to cold conditions. In further examples, the controller is programmed to issue a command to periodically operate the engine during storage based on at least one of a measured storage duration, a battery SOC signal, a battery temperature signal, a fuel level, and a user scheduled departure time.

Figure 2:
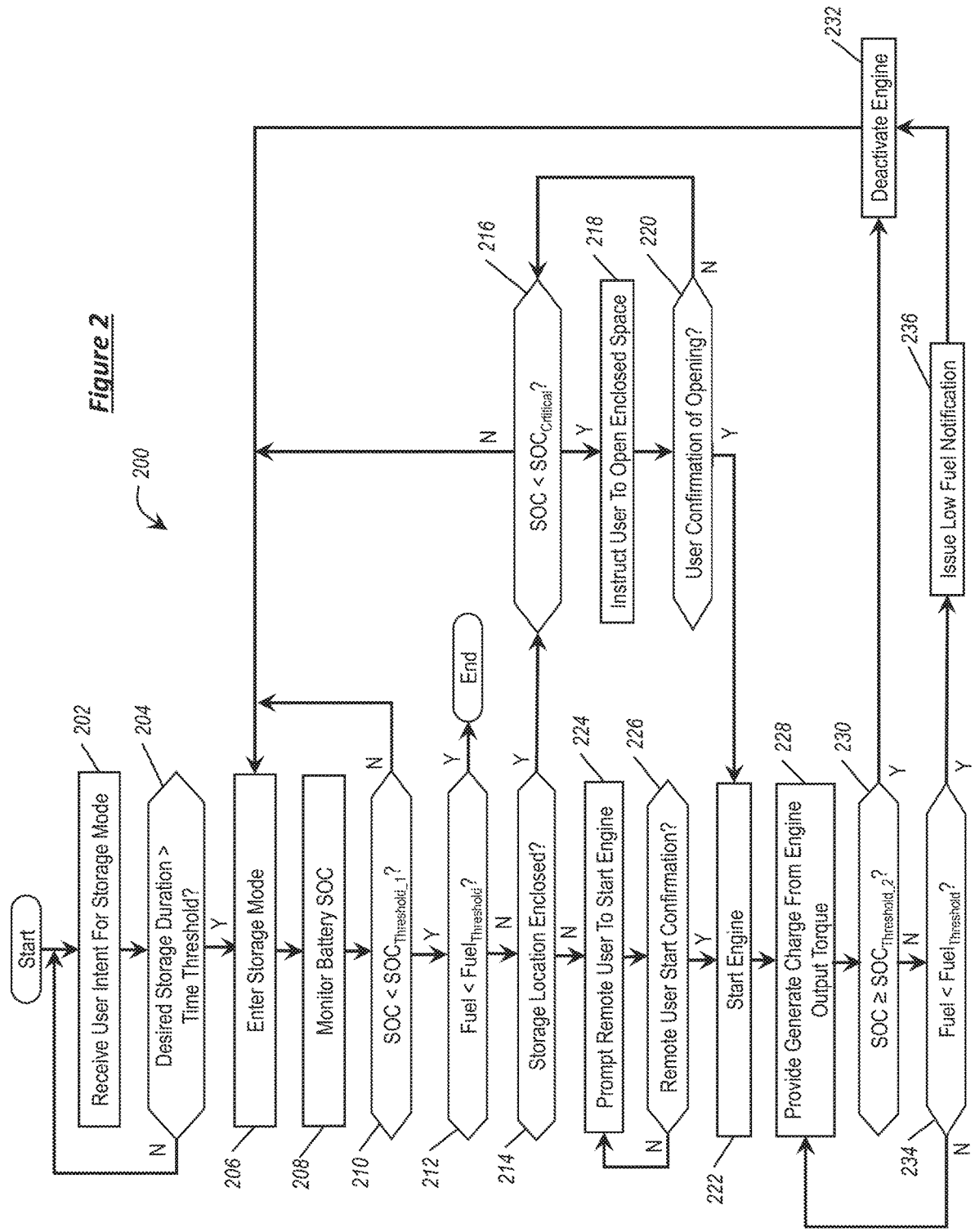
FIG. 2 is a flowchart of a first method of maintaining battery health during vehicle storage.

Referring to FIG. 2, method 200 represents an algorithm to maintain desired battery operating conditions during extended storage periods. At step 202, the algorithm includes receiving data indicative of a user's intent to store the vehicle. In some examples, a user interface inside the vehicle allows the user to designate the vehicle to enter a "storage mode" discussed in more detail below. In other examples, a smartphone application allows the user to declare an intention to put the vehicle in storage. In further examples, a calendar integration is provided such that a user can schedule a long-term storage mode in advance. The user may be prompted to provide the length of time the vehicle will be stored and whether the vehicle is to be stored within an enclosed space. The user may also be notified of the vehicle fuel level at this time. The amount of storage time entered by the user may be used to determine a desired SOC of the high-voltage battery. While in storage mode the vehicle may automatically start the engine and idle charge until the desired SOC is achieved.

At step 204 if the desired storage duration is greater than a predetermined threshold, the vehicle may formally enter the storage mode at step 206. On the other hand, if at step 204 the desired storage duration is less than the threshold, the vehicle may remain in a standard vehicle off state while being stored.

Once in storage mode, the vehicle begins to monitor the battery SOC at step 208. So long as the battery SOC remains greater than a $SOC_{Threshold\_1}$ at step 210, the vehicle takes no additional mitigation action and remains in storage mode while continuing to monitor battery SOC.

If the battery SOC is depleted to less than the $SOC_{Threshold\_1}$ at step 210, the algorithm includes assessing whether sufficient petrol fuel is present to operate the combustion engine. At step 212 if the petrol fuel level is less than a $Fuel_{Threshold}$, the vehicle may exit certain battery preservation portions of the storage mode since there is insufficient fuel available to operate the engine for charging. In some examples, insufficient fuel may trigger a warning message being sent to the user to indicate that automatic starting for recharge during storage mode is disabled. According to some examples the controller is programmed to inhibit the auto-start of the engine in response to a petrol fuel level less than a fuel threshold.

If at step 212 the vehicle's fuel level is greater than the $Fuel_{Threshold}$, the algorithm includes determining whether the vehicle's location is appropriate for an auto-start. As described above, part of a user's designation of the storage mode may include requiring an indication of the vehicle's storage location. According to some examples, the vehicle itself determines whether the storage location is enclosed or non-enclosed. According to some more specific examples, a GPS sensor disposed on the vehicle outputs a signal indicative of the vehicles geographic location to determine whether the storage location is enclosed. In other cases, a user may designate certain storage locations, such as a "home" storage location or a "work" storage location, for example.

If at step 214 the vehicle is stored in an enclosed location, the algorithm may disable auto-start portions yet still undergo other portions of the battery preservation procedures. If the vehicle is stored in an enclosed space while in storage mode at step 214 the algorithm includes continuing to monitor the SOC of one or more vehicle batteries during the time of storage. If the battery approaches a critical charge level the customer is alerted to the charge status and is allowed to confirm that the enclosed space has become opened before the vehicle will be allowed to auto-start. If at step 216 the battery SOC is depleted to less than $SOC_{Critical}$, the algorithm includes sending the user a notification message at step 218 indicating that the enclosed storage location is preventing an auto-start. In this way, the user may be allowed to remotely open a garage door or other opening to create a non-enclosed space prior to allowing the vehicle to auto-start for battery charging.

According to alternate examples, other conditions may prompt an inhibition of a storage mode auto-start. For example, the vehicle may be equipped with one or more sensors capable of outputting signals indicative of the detection of an external object. More specifically, sensors supporting autonomous or semi-autonomous vehicle driving functions may be used to detect an external object within a vicinity of the vehicle while in storage. Even more specifically, an external object may be deemed to be within the vicinity for the purposes of inhibiting a storage mode auto-start when the detected object is within 2 feet of the vehicle. Thus, a controller may be further programmed to inhibit the auto-start of the engine in response to detection of an external object in a vicinity of the vehicle.

The algorithm may further include confirming that the user opened the enclosed space prior to allowing an auto-start. If at step 220, there is confirmation that the user has opened the enclosure, the algorithm includes starting the engine at step 222. According to some examples, the user is allow to confirm that the previously-enclosed space has been opened by selecting a confirmation via a mobile application user interface. In other examples, a vehicle vision system may observe visual changes in the environment near the vehicle and output data sufficient for the vehicle controller to determine that the previously-enclosed space has been opened.

If at step 214 the vehicle is not stored in an enclosed space, the vehicle will be allowed to auto-start the engine to maintain a healthy battery SOC during storage. At step 224, the customer is notified via a smartphone app and the customer will be given options on when the engine auto-start for recharging should occur. At step 224 the algorithm includes prompting a remote user to approve an engine auto-start. In response to approval from the remote user at step 226, the algorithm includes auto-starting the engine at step 222. While remote user confirmation is required as part of some examples, other alternate examples may include automatically starting the vehicle to preserve battery SOC without an express user confirmation.

Once the engine is started, the electric machine is used to generate power from the engine output torque. The power generated is provided to the battery to recharge to a suitable SOC level. The algorithm continues to monitor battery SOC during recharge and maintains engine operation as long as SOC is less than a $SOC_{Threshold\_2}$. If at step 230 the SOC has been replenished to greater than $SOC_{Threshold\_2}$, the engine is deactivated at step 232 and the algorithm includes restarting storage mode at step 206 and monitoring battery health.

When charging while SOC is less than $SOC_{Threshold\_2}$, the algorithm includes monitoring the fuel level of the vehicle while running the engine. At step 234 if the fuel level is greater than $Fuel_{Threshold}$, the vehicle continues to operate the engine to generate power for battery recharging. Once sufficient SOC is attained the algorithm includes returning to the monitoring portions of the storage mode, for example returning to step 206.

If at step 234 the fuel level is less than $Fuel_{Threshold}$, the controller is programmed to issue a low fuel notification at step 236. The engine is then deactivated at step 232, and the algorithm re-enters storage mode at step 206. In this way, once a user is notified of a low fuel condition, the user has an opportunity to refuel the vehicle while allowing it to remain in storage mode for future auto-starts to promote battery health. In one specific example, a vehicle stored long term as part of a vehicle fleet or dealer inventory may notify service personnel of a low fuel condition and following a refuel continue to perform auto-starts as necessary to maintain battery SOC within a desired range.

If the vehicle remains in storage long enough, this process repeats indefinitely to maintain a healthy SOC level and thus ensure proper operation of the vehicle upon the user's return. However, when a vehicle is cold started, additional fuel is injected to improve combustion and robustness of the engine start event. If this storage mode engine start process is allowed to repeat and the vehicle never reaches operating temperature, excessive fuel may remain in the engine oil potentially leading to carbon deposit build-up on the spark plugs. Over time, these factors can cause fouled spark plugs, incorrect adaptive fuel learning, and engine mis-starts. Thus, after a calibratable number of storage mode engine start events the vehicle may undergo an extended start and remain running until oil temperature reaches a full operating temperature. In this way the engine is allowed to burn off any residual fuel that has leaked into the engine oil. The customer will be notified of this "extended idle." This subroutine may be particularly useful to customers who reside in cold climates and take predominantly short trips. These customers may have the need for more frequent extended idle procedures.

While the above systems and methods are described as being used to replenish the high voltage battery, it should be appreciated that such systems and methods may similarly apply to replenish any number of other electrical power storage devices, including for example, the low-voltage auxiliary battery.

Figure 3:
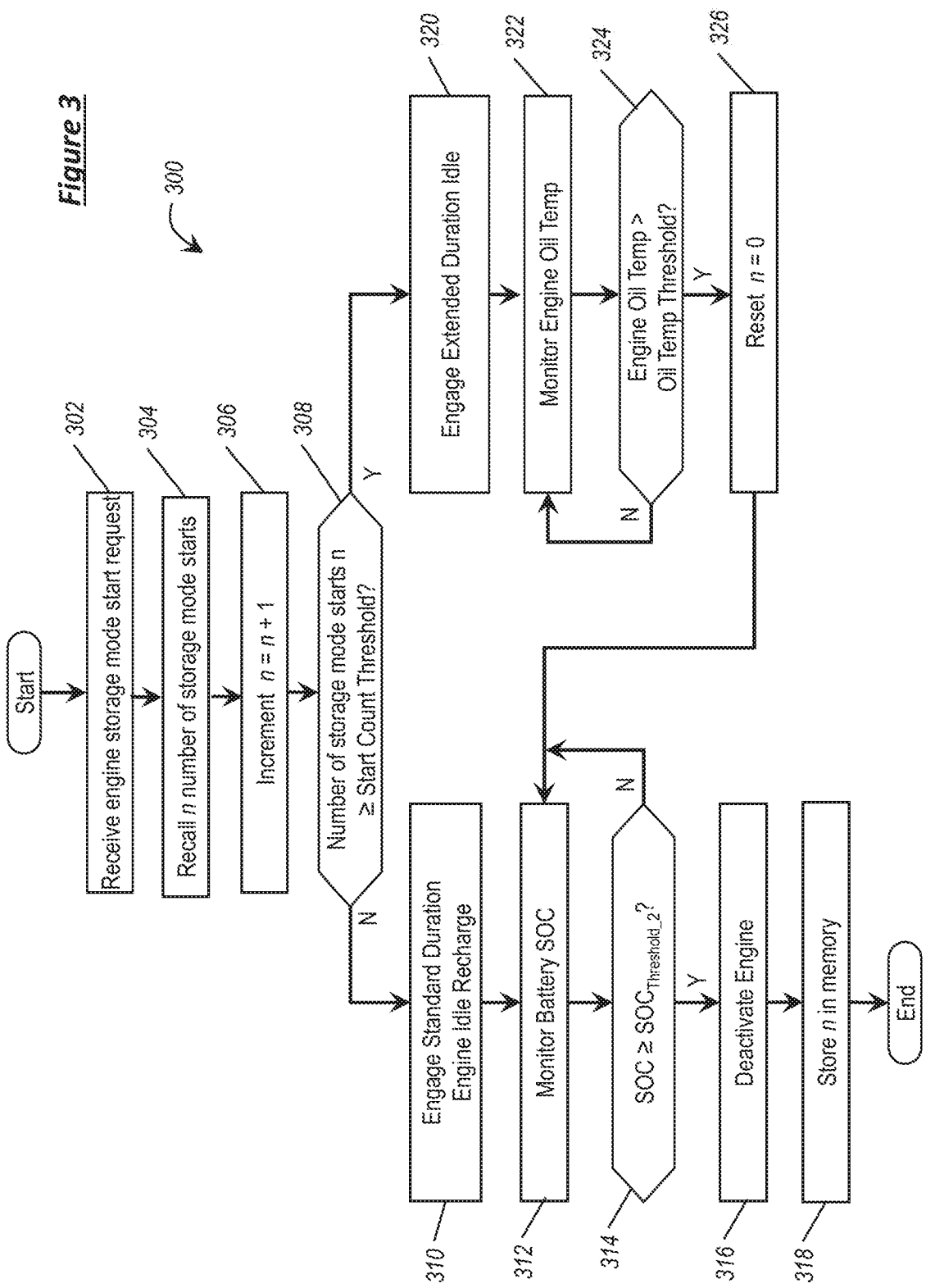
FIG. 3 is a flowchart of a second method of maintaining battery health during vehicle storage.

Referring to FIG. 3, method 300 represents an algorithm subroutine for implementing extended idle conditions. At step 302 the algorithm includes receiving an engine storage mode start request. As part of the selection of the particular type of start, the algorithm includes at step 304 recalling from memory the previous n number of storage mode auto-starts used for engine idle battery recharging since the last vehicle drive cycle. According to some examples, the controller is programmed to maintain a count of engine auto-starts since the most recent vehicle trip.

At step 306 the algorithm includes incrementing the storage mode auto-start count n to equal (n+1). If at step 308 the updated start count is less than a start count threshold, the algorithm includes undertaking a standard duration storage mode idle recharge at step 310 much like the example procedures discussed above. At step 312 the algorithm includes monitoring the high-voltage battery SOC as the engine is idled and battery is charged. At step 314 if the SOC is not yet replenished to $SOC_{Threshold}$, the algorithm returns to step 312 and continues to monitor SOC.

If at step 314 the battery SOC is equal to or greater than the $SOC_{Threshold}$, sufficient charging has been achieved and the algorithm includes deactivating the engine at step 316. Once deactivated the algorithm further includes storing the updated auto-start count n to a memory for future use.

If at step 308 the updated auto-start count n is equal to or greater than the start count threshold, the algorithm includes at step 320 undergoing an extended duration engine idle to burn off residual excess fuel intermixed with the engine oil. At step 322, the algorithm includes monitoring engine oil temperature, for example as received by any of a number of temperature sensors disposed at the engine.

If at step 324 the oil temperature has not yet reached a predetermined oil temperature threshold, the algorithm returns to step 322 and allows the engine to continue idling while monitoring oil temperature.

If at step 324 the engine oil temperature is greater than the oil temperature threshold, the algorithm may reset the start count n to equal zero at step 326. According to some examples, the algorithm may include returning to step 312 and beginning to monitor SOC to ensure adequate high-voltage battery charge for future drive cycles. By prioritizing oil temperature, then SOC, the algorithm ensures both burn-off of residual fuel deposits as well as sufficient battery charge for future drive cycles. According to some examples, the controller is programmed to, in response to the engine auto-start count exceeding a threshold, perform an extended engine idle having a duration sufficient to burn off residual excess fuel that is intermixed with engine oil. In some alternative examples, the algorithm subroutine represented by method 300 may terminate following achievement of sufficient oil temperature.

The above systems and methodologies make it easier for the customer to store the vehicle over a season, before a trip, or even overnight and maintain confidence that it will start reliably when they return, especially in cold weather and near the end of the vehicle's life. Failed engine starts may cause the customer to be stranded and/or require towing to a service location. As the vehicle and high-voltage battery age, the battery's power capability decreases. The systems and methods of the present disclosure help ensure the customer is not more likely to be stranded as their vehicle ages. As such, the algorithms of the present disclosure are self-adjusting according to the real-time conditions of the battery and auto-start more or less frequently based on the age of the vehicle. Moreover, since cold temperatures are a strong contributor to cause a high-voltage battery's SOC to degrade, an inoperable vehicle in such conditions is even more inconvenient than in warm conditions. By utilizing the systems and methods described herein, weaknesses associated with electrical power retention during extended storage are offset and the vehicle can remain stored, yet fully operational, for extremely long periods of time.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a combustion engine configured to output mechanical power;
   an electric machine coupled to the engine and configured to convert the mechanical power to electrical power;
   a battery configured to exchange electrical power with the electric machine; and
   a controller programmed to,
      receive user input indicative of at least one of a desired storage duration and a storage location,
      monitor a battery state of charge (SOC),
      in response to the SOC depleting to less than a predetermined threshold while the vehicle is stored, auto-start the engine to generate power to recharge the battery,
      in response to the SOC exceeding the predetermined threshold while the vehicle is stored, deactivate the engine,
      maintain a count of engine auto-starts that occur while the vehicle is continuously stored between drive cycles, and
      in response to the count exceeding a count threshold, perform an extended engine idle to burn off residual fuel intermixed with engine oil.

2. The vehicle of claim 1 wherein the controller is further programmed to inhibit the auto-start of the engine in response to detecting the vehicle being stored in an enclosed storage location.

3. The vehicle of claim 2 wherein the controller is further programmed to provide a user instruction to open the enclosed location, and in response to confirmation of opening the enclosed location allow the auto-start of the engine.

4. The vehicle of claim 1 wherein the controller is further programmed to inhibit an auto-start of the engine in response to a petrol fuel level less than a fuel threshold.

5. The vehicle of claim 1 wherein the controller is further programmed to, during the extended idle, deactivate the engine in response to an engine oil temperature exceeding a temperature threshold.

6. The vehicle of claim 1 wherein the controller is further programmed to inhibit the auto-start of the engine in response to detection of an external object in a vicinity of the vehicle.

7. The vehicle of claim 1 wherein the controller is further programmed to issue a user notification to a mobile device indicative of the auto-start.

8. A method for maintaining battery health during storage of a hybrid vehicle having a combustion engine and a battery-powered electric machine, the method comprising:
   monitoring a battery state of charge (SOC) while the hybrid vehicle is parked;
   automatically starting the engine to generate power to recharge the battery in response to the SOC depleting to less than a predetermined threshold;
   deactivating the engine in response to the SOC being replenished to greater than the predetermined threshold;
   maintaining a count of engine auto-starts that occur while the vehicle is continuously stored between drive cycles; and
   in response to the count exceeding a threshold, performing an extended engine idle to burn off residual fuel intermixed with engine oil.

9. The method of claim 8 further comprising inhibiting an auto-start of the engine in response to detecting the vehicle being stored in an enclosed location.

10. The method of claim 9 further comprising issuing a user instruction to open the enclosed location, and in response to confirmation of opening the enclosed location allowing the auto-start of the engine.

11. The method of claim 8 further comprising, during the extended idle, deactivating the engine in response to an engine oil temperature exceeding a temperature threshold.

12. The method of claim 8 further comprising inhibiting an auto-start of the engine in response to a petrol fuel level less than a fuel threshold.

13. The method of claim 8 further comprising issuing a low fuel notification to a user in response to a petrol fuel level depleting to less than a fuel threshold while the vehicle is stored.

14. A vehicle comprising:
   a combustion engine configured to output mechanical power;
   an electric machine coupled to the engine and configured to convert the mechanical power to electrical power;
   a battery configured to exchange electrical power with the electric machine; and
   a controller programmed to,
      receive a user input indicative of at least one of a desired storage duration and a storage location, monitor a battery state of charge (SOC) while the vehicle is stored, prompt a remote user to approve an engine auto-start in response to the SOC depleting to less than a predetermined threshold while the vehicle is stored, auto-start the engine to generate power to recharge the battery in response to remote user approval, inhibit the auto-start of the engine in response to the vehicle being stored in an enclosed storage location, and maintain a count of engine auto-starts while the vehicle is continuously stored since the most recent drive cycle, and in response to the count exceeding a threshold perform an extended engine idle to burn residual excess fuel intermixed with engine oil.

15. The vehicle of claim 14 wherein the controller is further programmed to deactivate the engine in response to the SOC being replenished to greater than the predetermined threshold.

16. The vehicle of claim 14 wherein the controller is further programmed to provide an instruction to the remote user to open the enclosed location, and in response to confirmation of opening the enclosed location allow the auto-start of the engine.

17. The vehicle of claim 14 wherein the controller is further programmed to deactivate the engine in response to an engine oil temperature exceeding a temperature threshold during the extended engine idle.

18. The vehicle of claim 14 wherein the controller is further programmed to inhibit the auto-start of the engine in response to a petrol fuel level less than a fuel threshold.

19. The vehicle of claim 14 wherein the controller is further programmed to issue a low fuel notification to a user in response to a petrol fuel level depleting to less than a fuel threshold while the vehicle is stored.

* * * * *